_United States Patent_ [19]

Lockwood et al.

[11] Patent Number: 4,532,883

[45] Date of Patent: Aug. 6, 1985

[54] PROCESS FOR CONTROLLING THE MICROBIAL ENVIRONMENT IN ABALONE MARICULTURE

[75] Inventors: George S. Lockwood, Carmel Valley; John H. Phillips, Pebble Beach, both of Calif.

[73] Assignee: Monterey Abalone Farms, Monterey, Calif.

[21] Appl. No.: 541,993

[22] Filed: Oct. 14, 1983

[51] Int. Cl.³ ............................................. A01K 61/00
[52] U.S. Cl. ........................................................ 119/4
[58] Field of Search ................................... 119/2, 3, 4

[56] References Cited

U.S. PATENT DOCUMENTS

| | | | |
|---|---|---|---|
| 3,196,833 | 7/1965 | Glancy | 119/4 |
| 3,486,486 | 12/1969 | Vanderborgh, Jr. et al. | 119/4 |
| 3,495,573 | 2/1970 | Vanderborgh, Jr. et al. | 119/4 |
| 4,183,322 | 1/1980 | Shultz et al. | 119/4 |
| 4,198,926 | 4/1980 | Morse | 119/4 |
| 4,226,210 | 10/1980 | Lockwood et al. | 119/4 |
| 4,253,418 | 3/1981 | Lockwood et al. | 119/4 |
| 4,449,480 | 5/1984 | Ison et al. | 119/4 |

FOREIGN PATENT DOCUMENTS 59922   3/1971   Australia .
489454  2/1976   Australia .

_Primary Examiner_—Hugh R. Chamblee
_Attorney, Agent, or Firm_—Christie, Parker & Hale

[57] ABSTRACT

In a process for mariculture of abalone, the male and female abalone are pretreated prior to spawning with one or more antibiotics in a seawater bath that is essentially bacteria-free. Eggs are filtered from the bath in which spawned and fertilized, and placed in a hatching bath of essentially bacteria-free seawater containing one or more antibiotics. After the eggs hatch, and the larvae have broken away from their respective cases, the larvae are transferred, free of egg debris, to a third bath of essentially bacteria-free seawater containing one or more antibiotics and selected beneficial antibiotic-resistant strains of bacteria which are separately cultured and which control ammonia and provide other benefits. Upon development to a settlement stage, the larvae are transferred to a final settlement bath of essentially bacteria-free seawater containing one or more antibiotics and selected beneficial antibiotic-resistant strains of which induce settlement, are a source of food for the duration of larval development and subsequent early growth of the abalone, and help control the level of toxic ammonia to within acceptable levels.

25 Claims, No Drawings

PROCESS FOR CONTROLLING THE MICROBIAL ENVIRONMENT IN ABALONE MARICULTURE

BACKGROUND OF THE INVENTION

Significant improvements in the mariculture of abalone and other gastropod molluscs are presented in U.S. Pat. Nos. 4,183,322, 4,226,210, and 4,253,418, the disclosures of which are incorporated herein by reference. The present invention is directed to further advances in growing large numbers of healthy abalone through early life stages when some bacteria and other microorganisms are potentially lethal, and at least one bacterium is essential.

We here disclose processes for the prespawning preparation of adult abalone, and improved processes for egg cleaning, hatching, larval growing, settlement, and post-settlement life, whereby substantially greater numbers of animals survive the first two months of life when high mortality is otherwise experienced. These improved processes include the use of bacteria-free water at each stage; the use of separately cultured selected bacteria for inducing settlement, providing early nutrition, and maintaining water quality control; and the use of antibiotics to control the growth of unwanted bacteria. A further refinement involves addition of nutrients to the water bath for inducing growth of the desired bacteria and improving the effectiveness of the antibiotics being used.

U.S. Pat. No. 4,183,322 discloses the process of cleaning recently spawned abalone eggs, hatching them, and growing the larvae. It describes the spawning and fertilization process, and teaches the following steps to obtain a high level of hatching and larvae survival:

1. Separation of eggs from the body of seawater into which they are spawned through a multiple screening process using seawater that has been filtered and treated to reduce the bacterial count to less than about 100 cells per milliliter.
2. Hatching the eggs in water of a bacterial count of 100 cells per milliliter or less.
3. Growing the hatched larvae in seawater filtered to remove large components, but coarse enough (passing particles of about 25 microns or smaller) to retain biological components that control ammonia.
4. Maintaining temperature control, dissolved oxygen levels, and approximate egg and larval densities for various container configurations.

This process significantly reduces early mortality in that 90 percent of the eggs hatch, and 90 percent of very young larvae survive.

We have found, however, that the high survival rates experienced at this very early stage of life are not maintained during later stages of life. The increase in mortality rate is believed due to pathogenic wild bacteria, introduced from the parent abalone in the hatching bath and in the larval-growing bath, which infect the animals at this early stage.

U.S. Pat. No. 4,226,210 describes the biological process of larval settlement and metamorphosis, and the early nutritional stages of abalone and other benthic gastropod molluscs. The patent also discloses that, during the approximately first 60 days of the young abalone's crawling life, there is high mortality due to various causes, including bacteria, the quality of the settlement surface, and the nature of the microbial community thereon. Although the process therein described provides for substantial control over these deleterious effects with major improvements in survival over nature, this patent also recognizes that substantial mortality still occurs.

This patent also teaches that economical quantities of abalone can be settled and grown using method steps including the following:

1. Preconditioning of settlement surfaces to induce settlement and provide early nutrition by providing thereon a microbial community.
2. Using seawater free of, or with a minimum of, components harmful to the young abalone.
3. Maintaining satisfactory water quality by controlling the biological balance through induced photosynthesis with certain strains of algae and the addition of plant nutrients to provide food and to control waste products.
4. Control of temperature, oxygen levels, larval densities, water circulation, and other factors.

One preferred practice disclosed in U.S. Pat. No. 4,226,210 is to filter coastal seawater to remove large components, while retaining smaller wild microorganisms smaller than 5 to 10 microns in size, and then, for a period of several days, flowing such water through the settlement tank and over the settlement surfaces for formation of a settlement-inducing microbial community. This patent also suggests:

(1) use of seawater that is free of harmful components, including obtaining this quality of seawater by prefiltration; and
(2) conditioning the settlement surfaces by using separately cultured strains of bacteria or other microorganisms.

The techniques taught by this patent have resulted in significant improvements in mariculture production, but even greater reduction of animal mortality is desired.

The purpose of the present invention is to advance the art of culturing abalone through the egg, larval, and post-larval early life stages by precisely controlling all biological processes to prevent the entry and growth of harmful bacteria and other harmful biological components, while providing, through controlled cultured processes, sufficient quantities and qualities of bacteria or other microorganisms to induce a high level of settlement, and to provide adequate early nutrition for high survival and rapid growth through the first several months of life.

Both of these above-discussed patents describe the harmful effects of bacteria during the egg, larval, and post-larval stages, and U.S. Pat. No. 4,183,322 provides for the use of wild components of a bacterial size to control ammonia. Similarly, U.S. Pat. No. 4,226,210 provides for the use of wild bacteria and other similarly sized biological components for preconditioning settlement surfaces to induce settlement and provide early nutrition. Counts of wild bacteria approximating 100 cells per milliliter are allowed which, when used to fill the 2-million milliliter tanks routinely used in production operations for egg hatching, or for larval growing, or for settlement, as described in U.S. Pat. No. 4,253,418, allows up to $2 \times 10^8$ total bacteria to be introduced in each step. It is now believed that the introduction of such large numbers of microorganisms permits the introduction of harmful pathogens which can cause excessive mortality in later stages of life.

We have found that the use of bacteria-free seawater, in combination with the use of antibiotics and selected strains of separately cultured bacteria, greatly improves survival rates for young abalone through the first 60 days of life. The processes of this invention substantially reduce the probability of introducing harmful organisms, provide separately cultured needed bacteria, and provide antibiotics to control unwanted pathogens that are accidentally introduced.

It is known that young abalone need bacteria in their environment for consuming ammonia during the larval-rearing stages. The practice of this invention first involves isolation from the wild of superior strains of bacteria that consume ammonia during the larval stages, induce settlement in metamorphosis of larvae, and provide nutrition during the immediate post-settlement period. This process involves isolating from unfiltered, natural seawater different bacterial strains by using standard laboratory procedures for the isolation and culturing of marine bacteria.

The next step involves testing each isolated pure culture of these bacteria. Broth cultures, incubated for 24 to 48 hours, are diluted with 0.2 micron membrane-filtered seawater and added to sterile dishes containing 100 milliliters of the same filter-sterilized water. Fifty to one hundred swimming larvae are added to each of five replicate bowls for each dilution of culture tested. After addition of the larvae and bacteria, the bowls are placed in a controlled-temperature environment at a suitable temperature for that particular abalone species, and monitored each day for the number of larvae that have settled, the number that are dead, and the number remaining in the free-swimming state.

After an approximately 30-day period, such a screening process will identify some bacterial strains that are pathogenic, some that have no effect, and some that induce settlement and support rapid growth during the subsequent post-settlement period. The superior strains are then maintained in culture using standard bacteriological laboratory techniques. The selective isolation, testing, culturing, and utilization of such favorable bacterial strains is a important facet of this invention.

Bacteria that we have found to have the desired beneficial effect have the following properties in common:
(1) They can use single carbon compounds for energy and growth, and ammonia as a sole source of nitrogen.
(2) They do not require vitamins or other growth factors.
(3) They carry out a respiratory metabolism as opposed to a fermentative metabolism.
(4) They do not produce toxic metabolic products or release more complex toxic materials.

The bacterium of choice most closely resembles *Pseudomonas cepacia* and *Pseudomonas marginata*, and is described in greater detail below.

It is a further major feature of this invention to select and culture strains of the preferred bacteria that grow and thrive in the presence of the preferred antibiotics. Such resistant strains are useful in providing water quality control, settlement inducement, and nutrition necessary to sustain early life at the same time that a compatible antiobiotic compound is used to control harmful bacteria.

Another aspect of this invention is to select and culture strains of the preferred bacteria that are resistant to bacteriophages, which are bacteria-degrading, filterable, and naturally occuring viruses that can kill the preferred population of select bacteria in a very short time. Yet another feature is the addition of chemical compounds which provide nutrition for the preferred bacteria, and which, because of their growth-stimulating qualities, make the antibiotic compounds more effective by increasing the susceptibility of unwanted bacteria through growth stimulation. The practice of these features of this invention will be further described below.

In making the advancements herein disclosed it was found that elimination or control of harmful pathogenic bacteria during the first two months of abalone life would eliminate a major cause of mortality. When using coastal seawater in prior art, counts of wild bacteria can be as high as 10,000 cells per cubic centimeter (milliliter) for the unfiltered seawater. Even after the filtration and sterilization process described in the prior-art patents, the number of pathogenic strains, although a small percentage of the total wild population, can be sufficiently significant in size to infect a culture of young abalone and cause massive mortality sometime during the next 60-day period. Therefore, processes for eliminating wild bacteria entirely, or almost entirely, were developed.

Although we have now found the ideal is to eliminate all wild bacteria entirely from the culturing process in order to eliminate infectious pathogens, this ideal is virtually impossible in production. While seawater can be treated to eliminate all bacteria, and although tanks, utensils, and equipment can be sterilized by heat, chemicals, and other means, the abalone eggs carry bacteria obtained from the mother at the time of spawning. At the present time, no process exists for obtaining eggs in a bacteria-free condition from the mother abalone. Therefore, pathogens or potential pathogens are always present, and must be either destroyed or controlled in such a manner as to prevent development of sufficient populations to cause significant mortality in the post-larval abalone.

In the course of developing these processes, it was discovered that the principal pathogens were marine gram-negative bacteria. It was further discovered that one or more antibiotic compounds of the group consisting of polymyxin B, chloramphenicol, ampicillin, erythromycin, and chlortetracycline, were highly effective in either eliminating or controlling the growth of such pathogenic bacteria. Other antibiotics, such as neomycin, streptomycin, and gentamicin, are also effective, but we prefer to use one or more of those compounds listed above in the practice of this invention. While these antibiotic compounds are our preferred practice, this invention is not limited to using only those compounds listed.

SUMMARY OF THE INVENTION

The improved processes involve the steps of pretreating the parent males and females prior to spawning with certain antibiotics, and then separately filtering eggs from the water in which they were spawned and fertilized, according to the process of U.S. Pat. No. 4,183,322 in order to exclude excess sperm, feces, mucus, and other organic matter, which, during subsequent incubation, represents a dangerous source of undesirable bacteria and nutrients for bacterial growth and other adverse factors. The carefully separated eggs are next placed in a second hatching bath of essentially bacteria-free seawater containing one or more antibiotics. The eggs are maintained in the hatching bath for the incubation period until a major portion of the hatched larvae are broken away from their respective residual egg sacs. The larvae are transferred from the hatching bath into a new bath of essentially bacteria-free seawater containing one or more antibiotics and, in the process of such transfer, are carefully separated from hatching debris. We have found that the multiple bath technique, using several antibiotics coupled with the progressive separation of the eggs and larvae (as described in U.S. Pat. No. 4,183,322) from residual matter, greatly increases the survival rate and the general health of the resulting animals through the post-settlement life over what was previously experienced.

DESCRIPTION OF THE PREFERRED EMBODIMENT

The successful hatching of large quantities of eggs, and rearing larvae and post-larval abalone through the early juvenile stage of life, is a multistage process involving treatment of the parent abalone prior to spawning, control of the quality of seawater used in all stages, careful treatment of the eggs, larvae, and post-larval animals, and control of the microbial population during these life stages.

There are many processes by which essentially bacteria-free seawater can be obtained. In the practice of this invention, we prefer either of two alternative processes, the first being extensive filtration of coastal seawater through sand filters, two stages of diatomaceous earth filters, two stages of ultraviolet radiation, two stages of spun-fiber cartridge filtration (selected to remove particles larger than about 1.0 and 0.5 microns respectively), and finally, the use of membrane filters (MF-Millipore Filter type GS (0.22 $\mu$M), and Durapore Filter type GV (0.22 $\mu$M) are suitable commercially available filters) capable of removing all particles greater than 0.2 microns in size. This process essentially removes all bacteria. We are unaware of pathogenic bacteria smaller than 0.2 microns. Coarser filters of a 0.5 micron size or even larger may be used, but we prefer 0.2 micron filters due to the additional assurance they provide.

Our second preferred seawater-purification method is to use cold seawater, obtained from ocean depths greater than approximately 1000 feet, and having bacterial counts of less than 100 cells per milliliter, and often less than 1 cell per milliliter. A single filtration step through a 0.2 micron membrane filter removes all such bacteria.

Other methods to obtain such high-quality seawater may be used, such as super-intensive or long-duration ultraviolet radiation; high-temperature pasteurization or sterilization; X-rays; nuclear radiation; and high-voltage induction; ozonization; chlorination with subsequent neutralization of residual chlorine; osmosis; the use of artificial seawater made from sterile fresh water and chemical salts; and other methods. For reasons of process simplicity and economy, we advocate the two preferred techniques disclosed above. Both methods are satisfactory in providing essentially bacteria-free seawater which is a major feature of this invention.

The use of highly purified seawater reduces exposure of abalone eggs, larvae, and post-larval animals from an estimated $2 \times 10^8$ wild bacteria cells (contained in the larger tanks described above) to essentially only those bacteria carried forward from the parent on the eggs and subsequent larvae through the successive stages of development.

In the process from spawning to post-larval settlement, pretreatment of the male and female parent abalone with antibiotics prior to spawning helps to decrease contamination of the eggs and sperm with undesirable bacteria that are associated with the adult animals. The induction of spawning and fertilization involve techniques not forming a part of this invention. As decribed in U.S. Pat. No. 4,183,322, as soon as spawning occurs, the eggs are separated from the contaminated water containing feces, mucus, and other contaminants, including free or suspended bacteria provided by the parent stock. This is accomplished by a multiple filtration process in which the eggs are removed from the contaminated water and placed in water treated to be essentially bacteria-free. Diluted sperm that has been carefully separated from feces and mucus is then added, and after cell division begins to occur, the filtered eggs are separated from unused sperm.

In their natural habitat, it is believed that only a few of the millions of spawned eggs survive this early stage of life. It is the objective of our invention to greatly increase survival by the controlled processes described herein. Subsequent to the issuance of the aforementioned patents, important advances have been made leading to substantial improvements in survivability through the fertilized egg and the early juvenile post-larval stages. The use of seawater that has had a final filtration through a filter that removes components greater than 0.2 microns in size essentially removes all remaining bacteria. However, adherent to the surface of the fertilized eggs are bacteria that cannot be removed by physical means such as filtration and washing with this essentially bacteria-free seawater. Pretreatment of the parents prior to spawning helps to reduce the source of contamination. The addition of one or more antibiotics to the essentially bacteria-free water containing the eggs during hatching helps to control any increases in the bacterial population. The use of one or more antibiotics in the water to which the free-swimming larvae are transferred further controls the development of bacteria. Finally, the additional antibiotic treatment of larvae during the settlement and early post-settlement periods continues this kind of control of wild pathogenic bacteria.

As described in U.S. Pat. No. 4,226,210, the larvae are extremely selective in determining surfaces for settlement, and we have improved the process described in this patent for preparation of the settlement surfaces. In contrast to the previously described method where natural wild species of bacteria and other microorganisms are encouraged to grow on settlement surfaces in the culturing system, we have learned that the use of selected separately cultured bacteria provides substantially superior results.

A further refinement is the use of pure strains of these bacteria that are selected to be resistant to specific antibiotics so the preferred bacteria can be used to induce settlement and provide early nutrition in a bath that also contains those antibiotics being used to control wild and harmful bacteria. Selection of antibiotic resistant strains is achieved by repeated subculture in the presence of increasing concentrations of an antibiotic using standard bacteriological techniques until a strain with sufficient resistance is obtained.

Another further refinement is the use of selected antibiotic-resistant strains of these beneficial bacteria that are resistant to bacteriophages harmful to the selected bacteria. Strains resistant to bacteriophage are obtained by exposing large populations of a bacterial strain to bacteriophage and after repeated subculture isolating strains which no longer give evidence of supporting the development of destructive, lytic bacteriophage. These bacteriophages are present from time to time in seawater, and are not removed by filtration through 0.2 micron filters. In addition to these proven techniques, we contemplate that it is possible to develop even superior strains of bacteria through genetic manipulation, although further work remains in this area.

The presently preferred beneficial bacterium most closely resembles *Pseudomonas cepacia* and *Pseudomonas marginata* which are partially described in "Bergey's Manual of Determinative Bacteriology, "Eighth Edition, R. E. Bachanan and N. E. Gibbins, coeditors, the Williams & Wilkins Co., Baltimore, 1974. A more complete description of these bacteria is to be found in "The Aerobic Pseudomonads: A Taxonomic Study," by R. Y. Stainer, N. J. Palleroni, and M. Doudoroff, J. Gen. Microbiol. (1966), 43, 159–271, and "Taxonomy of the Aerobic Pseudomands: *Pseudomonas cepacia, P. marginata, P. alliicola,* and *P. caryophylii,*" R. W. Ballard, N. J. Palleroni, M. Doudoroff, R. Y. Stanier, and M. Mandel, J. Gen. Microbiol. (1970), 60, 199–214. Although the bacterium of choice appears to be related to these pseudomonads, it does not correspond exactly to any of these described species.

The beneficial bacteruim of choice is called *Pseudomonas sp.* Monterey Abalone Farms Strain 13 as deposited in the American Type Culture Collection under ATCC No. 39451. This bacterium has the following characteristics:

(1) It is a Gram-negative rod, motile with polar multitrichous flagellation.

(2) Its metabolism is respiratory rather than fermentative, and it cannot reduce nitrate to nitrite, nor live anaerobically by denification.

(3) It does not fix nitrogen, is catalase-positive, gives a weak to negative oxidase reaction, and does not produce indole.

(4) It stores poly-$\beta$-hydroxybutyrate as a cellular reserve.

(5) It produces a yellow non-florescent pigment on some media.

(6) It does not produce arginine dihydrolase, nor are extracellular hydrolases for gelatin or starch produced.

(7) It has no special growth factor requirements and can grow with ammonia or nitrate as a source of nitrogen.

(8) It can use any of the following compounds as a sole source of carbon and energy: D-ribose, D-glucose, D-mannose, D-galactose, D-fructose, sucrose, trehalose, maltose, gluconate, acetate, propionate, butyrate, malonate, succinate, DL-malate, DL-$\beta$-hydroxybutyrate, DL-lactate, citrate, pyruvate, mannitol, meso-inositol, glycerol, ethanol, n-propanol, glycine, L-$\alpha$-alanine, $\beta$-alanine, L-serine, L-leucine, L-isoleucine, L-aspartate, L-glutamate, L-lysine, L-arginine, L-ornithine, L-tyrosine, $\lambda$-aminobutyrate, L-proline, L-phenylalanine, betaine, and asparagine.

(9) It cannot use any of the following compounds as a sole source of carbon and energy: D-xylose, D-arabinose, L-arabinose, D-fucose, L-rhamnose, cellobiose, lactose, starch, 2-ketogluconate, caproate, pelargonate, oxalate, maleate, adipate, DL-tartrate, glycollate, laevulinate, sorbitol, ethylene glycol, dulcitol, methanol, isopropanol, n-butanol, geraniol, benzoate, p-hydroxybenzoate, m-hydroxybenzoate, phenylacetate, phenol, testosterone, L-threonine, DL-norleucine, L-valine, $\delta$-aminovalerate, L-citruline, L-histidine, L-tryptophan, p-aminobenzoate, putrescine, histamine, creatine, pantothenate, acetamide, and nicotinate.

The addition of chemical nutrients to the bath of seawater contained in the settlement tank helps to maintain a viable population of the selected beneficial bacteria. The growth of this population of bacteria is required to produce the proper surface for settlement, to provide adequate beneficial bacteria for early life nutrition, and to control the concentration of such harmful components as ammonia released through the metabolism of the larvae. The addition of bacterial nutrients during the early antibiotic treatments also improves the efficacy of those antibacterial agents for harmful bacteria that would otherwise be in a temporary nongrowing and resistant state.

We have found that sodium citrate at 2 to 4 parts per million (ppm) by weight added to the seawater bath containing the introduced bacteria provides good growth of the bacteria we have selected. While we prefer the addition of this specific nutrient because of its role in the nutrition of our particular selected species, our invention is not limited to this particular added compound, and other nutrients such as sodium acetate, glucose, or sucrose may be used.

The choice of nutrient is based on the following considerations. The nutrient should be readily metabolized by the beneficial bacterium and the majority of harmful bacteria as well, yet the nutrient should not contain nitrogen since metabolism of the nutrient by the beneficial bacteria for growth causes the uptake and removal from the water of toxic ammonia which is used as a nitrogen source by the beneficial bacteria.

EXAMPLE OF PROCESS

More specifically, what we have developed is a process for growing abalone through the early life stages in a microbiologically controlled environment commencing with treatment of the parents prior to spawning, and treating egg, larval, and early post-larval abalone, a preferred process having the following steps:

a. Maintaining previously cleaned (brush scrubbed) adult animals in essentially bacteria-free seawater containing one or more antibiotics in solution for a period of at least 48 hours prior to spawning, or for a period sufficient to reduce the level of deleterious marine bacteria associated with the adult animals.

b. Replacing the antibiotic-containing seawater with essentially bacteria-free seawater. The spawning and fertilization processes, and the separation of the fertilized eggs, use techniques described in U.S. Pat. No. 4,183,322.

c. Placing the separated, cleaned, and fertilized eggs in a second body of essentially bacteria-free seawater containing one or more antibiotics for a period necessary for incubation and hatching.

d. Selectively transferring the resultant larvae substantially free of hatching debris by the process described in U.S. Pat. No. 4,183,322, to a third body of essentially bacteria-free seawater containing one or more antibiotics, and adding antibiotic-resistant strains of beneficial bacteria to this seawater bath.

e. Transferring the developed larvae from the third body of seawater into a settling tank (as described in U.S. Pat. No. 4,253,418) of essentially bacteria-free seawater, into which is added one or more antibiotics, and selected and separately cultured strains of beneficial antibiotic-resistant bacteria (as described above) that will induce settlement of the free-swimming larvae, provide food for the developing abalone after settlement and metamorphosis, and metabolize ammonia released by the larvae through their metabolic processes.

In this process, the antibiotics we prefer to use, either alone or in combination, are polymyxin B, erythromycin, ampicillin, chloramphenicol, and chlortetracycline. We routinely use concentration levels of 10 ppm of the active antibiotic compound dissolved in the seawater bath, but greater and lower concentrations are effective, and this process is not limited either to these specific antibiotics or to these concentration levels.

In the process of this invention, one or more antibiotics are used as follows:

a. The use of one antibiotic compound in any one or more of the above steps.
b. The use of a combination of one or more of the antibiotics in one or more of the above steps.
c. The use of a sequence of antibiotics through two or more stages.

The choice of antibiotics used is based on effectiveness in controlling mortality due to harmful bacteria and lack of toxicity at effective concentration. Some antibiotics, for example, chloramphenical, tetracycline, novobiocin, and others, cannot be used at the egg stage due to toxicity although they are nontoxic to swimming larvae. The use of a sequence of antibiotics increases the antibiotic spectrum and, therefore, more effectively controls the variety of deleterious bacteria that can be present in different batches of larvae.

Our preferred practice is to use a sequence of antibiotics throughout the entire process from treatment of parents through the first 30 days after larvae addition to the settlement bath. A further improvement on this process is to use selected antibiotic-resistant strains of the separately cultured beneficial bacteria so that the preferred bacteria will thrive in the presence of a specific antibiotic, or combination of antibiotics, while unwanted bacteria accidentally introduced will be killed or controlled by the antibiotic. A still further advancement is to use bacteriophage-resistant and antibiotic-resistant strains of the separately cultured beneficial bacteria.

It is our practice to maintain and promote the population of the selected beneficial bacteria in the settlement tank by the addition of bacterial nutrients to the seawater. A presently preferred nutrient is sodium citrate at a concentration of 2 to 4 ppm by weight.

More specifically, gravid male and female abalones are placed in separate approximately 50-liter spawning tanks 48 hours prior to the intended spawn. The shells of these animals are thoroughly scrubbed to remove as much of the epiphytic biological community, including bacteria, as possible. The water in the tanks is either essentially bacteria-free or is filtered to have a very low bacteria count. In this example, the antibiotic chlortetracycline is added to the water bath and dripped into the stream of inflowing water in order to maintain a desired concentration level, e.g., 10 ppm, of the active compound over the entire 48-hour duration. The tanks are then emptied and refilled with essentially bacteria-free water, and the animals are spawned separately. After capturing the eggs on a 100 micron screen and passing them through a 300 micron screen for multiple successive stages in order to remove mucus, feces, and other unwanted materials, the filtered and washed eggs are sterilized, rewashed, and placed into a hatching tank. In most cases, several million eggs are produced, thereby necessitating a large hatching tank. With this number of eggs, we place them in a bath of seawater contained in an approximately 2000-liter tank that has been previously sterilized with chlorine, air-dried, and then filled with essentially bacteria-free seawater that has been passed through a 0.2-micron filter. A second antibiotic is then added to this second water bath. By way of this example, this antibiotic is polymyxin B at a concentration of 10 ppm.

After several days, the eggs will have hatched into the free-swimming larval form, and the larvae are collected upon a 100-micron screen, gently washed with bacteria-free water, and placed into a third water bath in a 2000-liter tank that has previously been sterilized with chlorine, air-dried, and filled with essentially bacteria-free seawater that has been passed through a 0.2-micron filter. A third antibiotic, in this example ampicillin, is added at a concentration of 10 ppm. An aliquot containing approximately $1.5 \times 10^9$ cells of selected beneficial bacteria that has been further selected and cultured to be resistant to ampicillin is added to the water bath. Gentle aeration assures the maintenance of adequate levels of oxygen and the gentle mixing of the larvae. We have found that larval densities of 10 larvae per milliliter, or even 20 larvae per milliliter, can be adequately grown in this culture system.

After approximately 48 hours in these tanks at a temperature controlled to be no greater than 15° C. for red abalone (*Haliotis rufescens*), the larvae are competent for settlement. They are then collected upon a 100-micron screen, gently washed with bacteria-free water, and transferred into a 2000-liter settling tank containing a multitude of surfaces as described in U.S. Pat. No. 4,253,418. These surfaces and the tank itself have been previously sterilized with dissolved chlorine at a concentration of approximately 100 ppm, air-dried, and subsequently filled with seawater that has been passed through a 0.2-micron filter.

A fourth antibiotic, in this example being chloramphenicol, is dissolved at a level of 10 ppm in the seawater. At this time, an aliquot is added containing approximately $5 \times 10^{11}$ bacterial cells of preferred strains (e.g., ATCC NO. 39451 described above) that have been further selected for resistance to the antibiotic chloramphenicol and to bacteriophages, and that have been grown separately in pure culture. Gentle aeration assures the mixing of the contents of the tank. In addition, bacterial nutrient consisting of 10 grams of sodium citrate is added to provide for the growth of the desired bacteria, and to provide for the improved effectiveness of the antibiotic in controlling and eliminating wild bacteria brought forward through the culturing process from the parents, or which may be accidentally introduced during one or more of these successive stages.

In most cases, the abalone larvae commence their settlement process and become bottom-crawling juvenile gastropods after about 14 to 21 days. The contents of the settlement tank are not changed for about 45 days, although additional select antibiotic-resistant, bacteriophage-resistant cultures of bacteria may be added if it is determined to be necessary. Such a determination is made on a weekly basis by using swab samples of the tank surface that are streaked onto agar plates.

Approximately 14 days after introduction of larvae into the final settling bath, diatoms of the species *Navicula* are added to the bath, diatom nutrients are added, and super-ambient light is injected into the tank to promote photosynthesis that controls the biological and chemical balance of the tank and provides an additional source of food for the young abalone as they continue their metamorphosis and grow through the juvenile stage. The preparation of these seed diatoms in a bacteria-free manner is known in the art.

In this example of the process, we have found that in excess of 60 percent of the larvae added to a settlement tank can survive, although in routine production we estimate that a more appropriate survival rate is 20 percent. This represents a substantial improvement over nature and over the prior art. Although the description herein used for example pertains to red abalone, this process is applicable to other species of abalone (e.g., pink abalone or *Haliotis corrugata*), to other gastropod molluscs, including, but not limited to, conch, loco, and other marine and aquatic motile benthic animals, including sea urchins, that are of economic and scientific importance. The process is believed especially beneficial in the culturing of sea urchins which are commonly found in nature in environments favored by abalone.

What is claimed is:

1. A process for culturing gastropod molluscs and other benthic motile marine and aquatic animals through the first months of life in a microbiologically controlled environment, comprising the steps of:
   a. placing cleaned parent animals in bacteria-controlling baths of substantially bacteria-free seawater containing an antibiotic;
   b. recovering eggs and sperm from the parent animals, and placing fertilized eggs in a hatching bath of substantially bacteria-free seawater containing an antibiotic;
   c. separating hatched larvae from the hatching bath for immersion in a holding bath of substantially bacteria-free seawater containing an antibiotic; and
   d. transferring developing larvae from the holding bath to a settlement bath of substantially bacteria-free seawater, the seawater containing an antibiotic and a selected species of beneficial bacteria resistant to the settlement-bath antibiotic.

2. The process defined in claim 1 wherein the parent animals are retained in the bacteria-controlling baths for about two days prior to spawning, and the baths are then emptied and refilled with fresh substantially bacteria-free seawater in which spawning is induced.

3. The process defined in claim 1 wherein the holding bath also contains a selected species of beneficial bacteria resistant to the holding-bath antibiotic.

4. The process defined in claim 1 wherein the hatched larvae are retained in the holding bath for at least one day.

5. The process defined in claim 1 wherein the beneficial bacteria are separately cultured and selected to be bacteriophage resistant.

6. The process defined in claim 1 wherein the seawater used in each bath is filtered to remove particles larger than about 0.2 microns in size.

7. The process defined in claim 1 wherein the seawater is obtained from a deep-ocean source of at least about one-thousand feet beneath the ocean surface.

8. The process defined in claim 1 wherein the animals are sea urchins.

9. The process defined in claim 1 wherein a bacterial nutrient is added to the settlement bath.

10. The process defined in claim 9 wherein the nutrient is sodium citrate.

11. The process defined in claim 10 wherein the beneficial bacteria:
   a. can use single carbon compounds for energy and growth, and ammonia as a sole source of nitrogen;
   b. do not require vitamins and similar growth factors;
   c. carry out a respiratory metabolism as opposed to fermentative metabolism; and
   d. do not produce toxic metabolic products, and do not release more complex toxic materials.

12. The process defined in claim 1 wherein the total process uses a sequence of different antibiotics.

13. The process defined in claim 12 wherein the antibiotics are selected from a group consisting of polymyxin B, chloramphenicol, ampicillin, erythromycin, chlortetracycline, neomycin, streptomycin, and gentamycin.

14. The process defined in claim 13 wherein the antibiotic selected for a particular bath is used at a concentration of about 10 parts per million in the seawater.

15. A process for culturing abalone through the first months of life, wherein a sequence of seawater baths is used for cleaning parent animals, hatching fertilized eggs, holding hatched larvae until ready for settlement, and providing settlement surfaces and nutrition for continued development and growth, comprising the steps of:
   a. using substantially bacteria-free seawater in each bath; and
   b. providing an antibiotic in the seawater in each bath to minimize bacterial contamination from the parent animals, and to prevent development of detrimental bacteria in the baths.

16. The process defined in claim 15, and further comprising the step of adding to the settlement bath a beneficial bacterium for inducing larvae settlement, controlling ammonia buildup, and providing nutrition for the developing abalone after settlement and metamorphosis, the bacterium being selected to be resistant to the settlement-tank antibiotic.

17. The process defined in claim 16 wherein the beneficial bacterium has characteristics corresponding to those of American Type Culture Collection No. 39451.

18. The process defined in claim 16, wherein the seawater used in each bath is free of particulates larger than about 0.2 microns in size when added to the bath.

19. The process defined in claim 18 wherein the seawater added to each bath has been filtered to remove harmful bacteria, and to remove particulates larger than about 0.2 microns in size.

20. The process defined in claim 18 wherein the seawater is drawn from a deep-ocean source at least about one-thousand feet beneath the ocean surface.

21. The process defined in claim 18 wherein different antibiotics are used in the several baths.

22. The process defined in claim 21 wherein the antibiotics are selected from a group consisting of polymyxin B, chloramphenicol, ampicillin, erythromycin, chlortetracycline, neomycin, streptomycin, and gentamycin.

23. The process defined in claim 18 and further comprising the step of adding a bacterial nutrient to the settlement-bath seawater.

24. The process defined in claim 23 wherein the nutrient is sodium citrate.

25. The process defined in claim 24 wherein the sodium citrate is added to achieve a concentration of about 2 to about 4 ppm in seawater.

* * * * *